(12) United States Patent
Von Gutfeld

(10) Patent No.: US 6,219,126 B1
(45) Date of Patent: *Apr. 17, 2001

(54) PANEL ASSEMBLY FOR LIQUID CRYSTAL DISPLAYS HAVING A BARRIER FILLET AND AN ADHESIVE FILLET IN THE PERIPHERY

(75) Inventor: Robert Jacob Von Gutfeld, New York, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,004

(22) Filed: Nov. 20, 1998

(51) Int. Cl.⁷ .................................................. G02F 1/1339
(52) U.S. Cl. ............................................. 349/153; 349/190
(58) Field of Search ..................................... 349/153, 190, 349/157

(56) References Cited

U.S. PATENT DOCUMENTS

| | | | |
|---|---|---|---|
| 4,647,156 | * | 3/1987 | Fujimura et al. ..................... 349/153 |
| 5,037,185 | * | 8/1991 | Grupp .................................. 349/153 |
| 5,106,441 | * | 4/1992 | Brosig et al. ........................ 349/190 |
| 5,459,598 | * | 10/1995 | Carrington ........................... 349/156 |
| 5,517,344 | * | 5/1996 | Hu et al. .............................. 349/153 |

* cited by examiner

Primary Examiner—Walter J. Malinowski
(74) Attorney, Agent, or Firm—Marian Underweiser, Esq.; McGinn & Gibb, PLLC

(57) ABSTRACT

When fabricating a liquid crystal panel from a pair of substrates using the "one-drop fill" method to deposit liquid crystal material in a central portion of one substrate and then sealing the substrates together with a fillet of epoxy between the outer peripheral portions of the substrates, the uncured epoxy tends to contaminate the liquid crystal material and impair its function. Here, a relatively thick barrier fillet, as of silicone elastomer, is deposited in the form of a continuous closed circuit upon one of the substrates and is fully cured before depositing the liquid crystal material within that closed circuit. To seal the substrates together, they are brought together to a spacing determined by a relatively thin spacer fillet provided on one of the substrates and an epoxy fillet is deposited along the outer periphery of the substrates. The barrier fillet, preferably compressed, serves to prevent contamination of the liquid crystal material by any regions of uncured epoxy. In one variation, the epoxy fillet is formed from a two-component epoxy by depositing a continuous circuit of one component to surround the barrier fillet on one substrate and depositing an identical continuous circuit of the other component on the other substrate before joining the substrates together to intermix and cause cross-linking of the the components to form a cured epoxy fillet.

11 Claims, 2 Drawing Sheets

PANEL ASSEMBLY FOR LIQUID CRYSTAL DISPLAYS HAVING A BARRIER FILLET AND AN ADHESIVE FILLET IN THE PERIPHERY

FIELD OF THE INVENTION

This invention relates to flat panel displays which utilize a pair of spaced-apart substrates having liquid crystal material therebetween and to methods for their assembly.

BACKGROUND OF THE INVENTION

There are several ways of assembling liquid crystal flat panel displays (LCD). For example, the prior art has used a method where the two substrate portions comprising the panel are first fully configured with all required thin film transistors (TFT's), circuit lines and color filters. The two substrate portions (hereinafter sometimes called "substrates") of the display panel are then aligned with respect to one another at a gap spacing on the order of about 5 microns (e.g. by using 5 micron glass spheres) and are then joined over most of peripheries using a two part pre-mixed high temperature epoxy that requires a temperature of approximately 180° C., applied for several hours to cure or cross-link. After this, the resultant empty panel assembly is placed in a vacuum chamber for removal of air and then placed in a dish of liquid crystal material which is forced into the evacuated panel space by backfilling the chamber with nitrogen gas. This prior art method is described in U.S. Pat. No. 5,029,623, issued on Jul. 9, 1991 to Stefan Brosig.

Any method of assembly that uses a thermal setting epoxy can be problematic because the curing temperature is too high for the liquid crystal material to tolerate without damaging its functional characteristics. For this reason, the assembly of an empty LCD panel from two substrates must precede the step of filling the empty panel with liquid crystal material. However, since the assembled empty LCD panel has a very narrow gap (e.g. 5 to 10 microns) between the two assembled substrates that form the panel, the filling step in vacuum is extremely slow, taking on the order of 3–5 hours.

More recently, a faster fill technique ("one-drop fill") has been developed wherein one panel substrate receives a filling of droplets of liquid crystal prior to joining it with the second panel substrate. A version of the one-drop fill method is disclosed in U.S. Pat. No. 5,263,888, issued to Teruhisa Ishihara et al on Nov. 23, 1993. Here, the sealant is typically a uv (ultraviolet) setting epoxy where cross-linking requires uv radiation. This one-drop fill method cannot use the thermally setting epoxy but must use instead the uv or other epoxy which cures (sets or cross-links) near room temperature. As will be understood, this uncured epoxy must necessarily come in contact with the liquid crystal because the epoxy forms the peripheral boundary wall for the liquid crystal material. There is mounting evidence that uncured epoxy and other sealants will react with the liquid crystal causing the latter to degrade in its performance as a liquid crystal material. This deleterious effect is especially likely in those regions of the display panel where there is incomplete curing of the uv epoxy because the uv light is unable to reach all portions of the epoxy due to shadows cast by the thin film circuitry that extends out to the periphery of the panel substrates.

SUMMARY OF THE INVENTION

The present invention proposes a number of LCD (liquid crystal display) panel structures and fabrication methods therefor which prevent deleterious mixing of the liquid crystal material with any potentially contaminating sealants such as epoxies or silicones. These are intended to be used with the "1 drop fill" method since this is becoming the preferred method of assembly. Once assembled, even if all the epoxy or other sealant is not hardened or the two components of the epoxy are not fully mixed, the proposed structures of this invention are designed to prevent contact between sealant and liquid crystal, thereby preventing degradation of the crystal over the long term.

Several structures are described that are deposited by vapor deposition or the like, generally using lithographic techniques to produce barriers that separate the liquid crystal from the sealant once the two substrates of the panel are aligned, joined, and the sealant has cured. Some of the proposed structures include a set of double walls with a space in between to receive any overflow of cured or uncured sealant. Another configuration includes a peripherally deposited hard material that is joined to a soft material forming a mechanical flange/O ring type of seal or interlock. The geometries are so chosen that either a uv cured epoxy or a two component cross-linking epoxy using a room or near-room temperature set (cross-linking) or cure can be used. In the latter case, it is proposed to apply the the two-component epoxy formulation such that only one component is applied to each of the two substrates forming the panel, with inter-mixing of the two parts occurring once the two substrates are joined and under pressure. Heat may be applied to accelerate cross-linking so long as the temperature is kept below about 100° C. in order to avoid damaging the liquid crystal material.

Accordingly, the present invention broadly provides a liquid crystal display panel comprising:
a) a pair of mutually spaced-apart substrates, the substrates being spaced apart by a substantially uniform gap, each substrate comprising a central portion and a peripheral portion surrounding the central portion,
b) a preselected quantity of liquid crystal material disposed between the central portions of the pair of substrates,
c) a barrier fillet disposed between the pair of substrates and in the peripheral portions thereof, the barrier fillet substantially surrounding and confining the preselected quantity of liquid crystal material to the central portion, and
d) an adhesive fillet which is disposed between the pair of substrates in the peripheral portions thereof and substantially forming an effective seal therebetween, the adhesive fillet surrounding said barrier fillet.

According to a preferred embodiment, the adhesive fillet comprises epoxy material, while the barrier fillet comprises both i) a first spacer fillet of a uniform thickness that surrounds the preselected quantity of liquid crystal material, and ii) a second spacer fillet of the aforesaid uniform thickness, the second spacer fillet surrounding the first spacer fillet.

Preferably, the barrier fillet (or at least one of said first spacer fillet and said second spacer fillet) comprises a compressible material (e.g. a fully cured silicone elastomer) and is compressed substantially uniformly between the pair of substrates. Moreover, under some circumstances, it may be desirable to provide a third spacer fillet of the aforesaid uniform thickness and surrounding the second spacer fillet, in order to further reduce any risk of migration of uncured epoxy into potentially contaminating contact with the preselected quantity of liquid crystal material.

The present invention also provides a method for fabricating a liquid crystal display panel comprising a pair of substrates mutually spaced-apart by a selected gap, each substrate comprising a central portion and a peripheral portion surrounding said central portion, the method comprising the steps of:

a) depositing a substantially continuous barrier fillet of material in the peripheral portion of at least one of the substrates, the barrier fillet being substantially uniformly at least as thick as said gap, b) depositing a preselected quantity of liquid crystal material in the central portion of one of the pair of substrates, c) depositing an adhesive fillet that is thicker than the selected gap in a continuous closed path upon at least one of said peripheral portions, and d) joining the pair of substrates into substantially gap-spaced adjacency of said peripheral portions.

According to a preferred embodiment, step (c) is carried out by:

i) depositing one component of a two-component epoxy material in a continuous closed path upon the peripheral portion of one of the pair of substrates, and ii) depositing the other component of the two-component epoxy material in a continuous closed path, corresponding to the continuous closed path of the one component, upon the peripheral portion of the other of said pair of substrates, whereby, upon carrying out step (d) to join the pair of substrates, the one component is intermixed with the other component along the entire lengths of their corresponding closed paths to cause cross-linking to form the adhesive fillet from two-component epoxy material. As will be understood, this novel use of a two-component, low-temperature cross-linking epoxy allows for as much processing time, with the epoxy components in place, as may be needed to complete filling with LC material and other operations, without concern about any cross-linking until the two substrates are actually joined together.

DETAILED DESCRIPTION OF THE INVENTION

Figure 1:
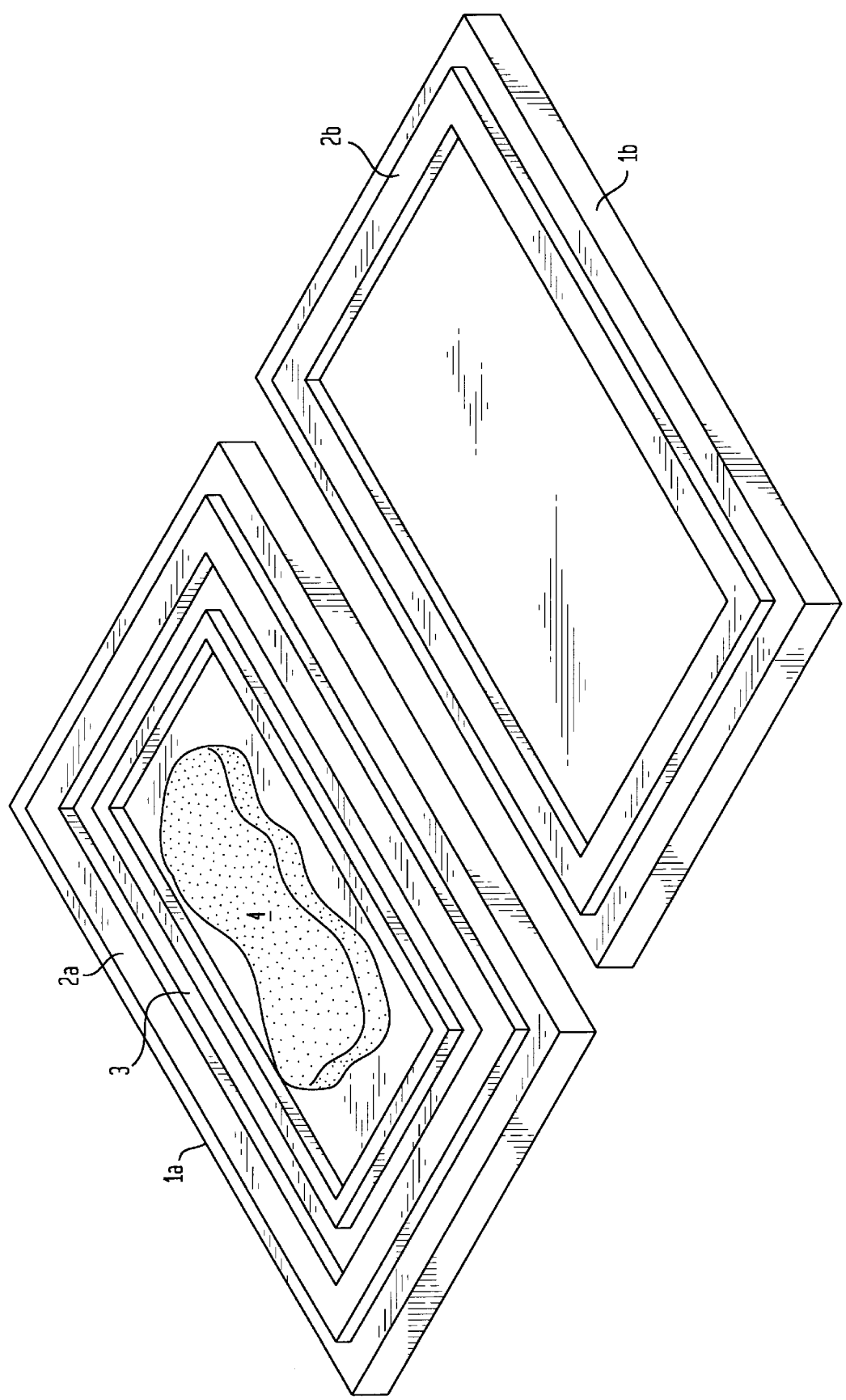
FIG. 1 is a schematic perspective view of a pair of substrates to be assembled into an LCD panel in accordance with one embodiment of the present invention.

FIG. 1 shows a pair of LCD panel substrates $1a$, $1b$, which may be composed of glass or other suitable material and provided with built-in thin film circuitry (not shown) as required. Substrate $1a$ is provided with a barrier fillet 3 of substantially uniform thickness which may be deposited upon substrate by suitable means. For example, the barrier fillet 3 may be composed of a hard material, such as glass, which may be deposited with the aid of lithographic masking, preferably to the thickness of the desired inter-substrate gap, g, (e.g. 5 microns) where the barrier fillet 3 is to serve as a spacer between substrates $1a$, $1b$ after they are joined together to form the LCD panel. A preselected quantity 4 of liquid crystal material is deposited in the central portion of substrate $1a$ where it is surrounded and confined by barrier fillet 3. This preselected quantity of LC material may be deposited by the method of aforesaid U.S. Pat. No. 5,263,888 to Ishihara et al or alternatively by use of a moving nozzle as described in U.S. patent application 09/076,147, filed May 11, 1998.

In order to carry out one preferred embodiment of the method of the present invention, one component $2a$ (e.g. resin) of a two-component, low temperature setting, epoxy adhesive material is deposited upon the peripheral portion of substrate $1a$ in a continuous closed path, which is depicted as substantially rectangular in FIG. 1. The second component $2b$ (e.g. hardener) of the two-component epoxy material is deposited upon the peripheral portion of the other substrate $1b$ in a continuous closed path which corresponds in size and shape to the continuous closed path of component $2a$. Components $2a$, $2b$ do not harden, cure, or cross-link unless they are mixed together. Next, substrates $1a$ and $1b$ are joined into aligned contact along the entire lengths of the continuous closed paths of components $2a$ and $2b$.

Figure 2:
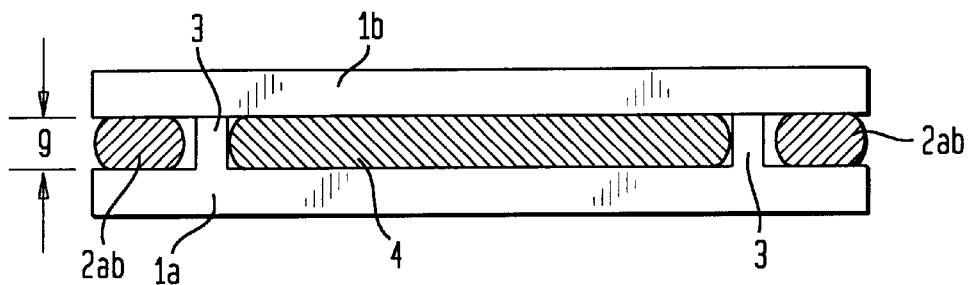
FIG. 2 is a cross-sectional view of the panel assembled in accordance with the embodiment shown in FIG. 1.

Substrates $1a$, $1b$ are then pressed together, as shown in FIG. 2, to intermix components $2a$, $2b$ and cause them to cross-link and cure at ambient room temperature (or some elevated temperature which hastens cross-linking but which is below a temperature (e.g. 100° C.) that would damage the LC material) to substantially form a hard adhesive fillet $2ab$ as an effective seal between substrates $1a$, $1b$.

As can be seen from the structures shown in FIGS. 1 and 2, barrier fillet 3 serves to substantially confine the preselected quantity 4 of liquid crystal material from contact with uncured epoxy components $2a$, $2b$. It is believed that such contact between the liquid crystal material and an uncured sealant, such as epoxy or silicone elastomer, may permit undesirable diffusion of sealant molecules into the liquid crystal material which causes degradation of its liquid crystal performance.

Because it is sometimes difficult to be precisely accurate in determining the selected quantity 4 of LC material that should be deposited in the central portion of substrate $1a$, it may be preferable to deposit an excess of LC material and then provide a small vent hole through the barrier fillet 3 and through the adhesive fillet $2ab$ to permit the excess LC material to escape during the step of joining substrates $1a$, $1b$ together.

Figure 3:
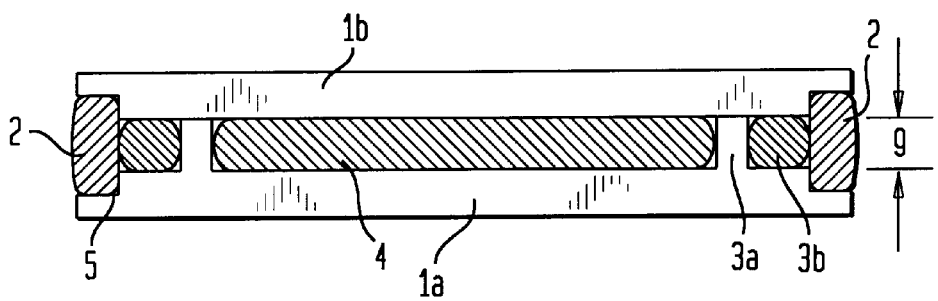
FIG. 3 is a cross-sectional view of a panel assembled in accordance with a second embodiment of the present invention.

FIG. 3 shows a second embodiment of the novel liquid crystal display (LCD) panel, in which the barrier fillet 3 of FIGS. 1, 2 is replaced by a glass spacer fillet $3a$ of uniform thickness, g, surrounded by a second spacer fillet 3b of compressible material, such as a fully cured silicone elastomer. As will be understood, during fabrication of the LCD panel, compressible fillet $3b$ is deposited on one of substrates $1a$, $1b$ in a substantially uniform thickness (e.g. 10–20 microns) that is greater than g (e.g. 5) microns. As a result, when substrates $1a$, $1b$ are assembled together, compressible fillet $3b$ is compressed along its entire length to form an effective barrier against mingling of LC (liquid crystal) material 4 with adhesive fillet 2, which may be composed of 2-component epoxy or any other uncured adhesive sealant material.

Figure 4:
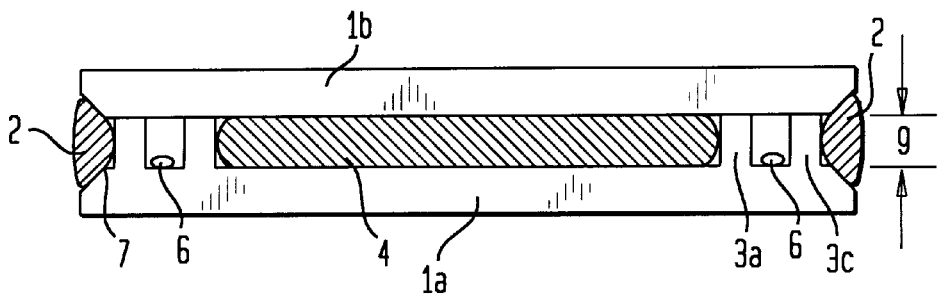
FIG. 4 is a cross-sectional view of a panel assembled in accordance with a third embodiment of the present invention.

FIG. 4 shows a third embodiment of the LCD panel of the present invention in which the barrier fillet 3 of FIGS. 1, 2 is replaced by a pair of spaced-apart glass ridge-like spacer fillets $3a$, $3c$ of substantially uniform thickness, g. The principal beneficial effect of using two ( rather than one) spacers 3a, 3c is to catch any spillover 6 of epoxy 2 or LC material 4 in the space between fillet 3a and fillet 3c. As will be understood, such a spillover 6 may occur when substrates 1a, 1b are pressed together during assembly of the LC panel.

It may be noted that substrates 1a, 1b have been provided with peripheral edges which have steps 5, as in FIG. 3, or chamfered surfaces 7, as in FIG. 4 to provide a peripheral groove for improved sealing by adhesive fillet 2 as well as to permit better illumination of the uncured epoxy by uv radiation when a uv-crosslinking sealant is used.

Many variations may be made to the embodiments of the proposed LCD panel which are shown in FIGS. 1 to 4. For example, on could employ a single barrier fillet formed on one substrate, while providing a corresponding groove in the opposing surface of the other substrate which conforms with and can tightly embrace the intruding part of the barrier fillet. Of course, some other spacer element, such as glass spheres or a second hard fillet, must be provided to maintain the desired inter-substrate spacing.

According to another variation, the barrier fillet may be represented by a single hard fillet, as in FIGS. 1, 2, which may have a layer of compressible material (e.g. Teflon (trademark), cured silicone rubber, etc.) thereon to improve the barrier effect against contamination between the LC material and the adhesive.

According to yet another variation, the barrier fillet arrangement provided in the peripheral portion of one of the substrates may take the form of two spaced-apart glass fillets of the same uniform spacer thickness, together with a thicker fillet of compressible material (e,g. cured silicone elastomer) between them. Of course, a selected quantity of LC material is deposited in the central portion of that substrate Then, when this substrate is joined with the other substrate, the thicker fillet of compressible material is is compressed to the thickness of the two glass fillets, while all three fillets minimize any commingling of LC material, silicone elastomer, and uncured epoxy adhesive over the life of the LCD panel.

While the present invention has been described with reference to preferred embodiments in order to facilitate a better understanding of the invention, those skilled in the art will recognize that the invention can be embodied in various ways without departing from the scope and spirit of the invention as set forth in the appended claims.

What is claimed is:

1. A liquid crystal display panel comprising:
   a) a pair of mutually spaced-apart substrates, said substrates being spaced apart by a substantially uniform gap, each substrate comprising a central portion and a peripheral portion surrounding said central portion;
   b) a preselected quantity of liquid crystal material disposed between the central portions of the pair of substrates;
   c) a barrier fillet disposed between the pair of substrates and in the peripheral portions thereof;
   d) an adhesive fillet disposed between said pair of substrates in a peripheral effective seal therebetween, said adhesive fillet surrounding said barrier fillet, said barrier fillet substantially surrounding and confining said preselected quantity of liquid crystal material to said central portion and out of contact with said adhesive fillet, said barrier fillet comprising:
      i) a first spacer fillet having a uniform thickness and surrounding said preselected quantity; and
      ii) a second spacer fillet having said uniform thickness, said second spacer fillet surrounding said first spacer fillet.

2. The liquid crystal display panel as set forth in claim 1, said adhesive fillet comprising epoxy material,
   one of said first spacer fillet and said second spacer fillet comprising a compressible material.

3. The liquid crystal display panel as set forth in claim 2, said compressible material comprising a fully cured silicone elastomer.

4. The liquid crystal display panel as set forth in claim 1, said adhesive fillet comprising epoxy material, said second spacer fillet comprising a compressible material and surrounding said first spacer fillet,
   said second spacer fillet being compressed substantially uniformly between said pair of substrates, said barrier fillet further comprising a third spacer fillet having said uniform thickness and surrounding said second spacer fillet.

5. The liquid crystal display panel as set forth in claim 1, one of said substrates having a groove which conforms with and tightly embraces said barrier fillet along the length thereof.

6. The liquid crystal display panel as set forth in claim 1, said pair of substrates comprising an outer edge,
   said outer edge comprising a groove with said adhesive fillet retained therein.

7. A liquid crystal display panel, comprising:
   a) a pair of mutually spaced-apart substrates, said substrates being spaced apart by a substantially uniform gap, each substrate comprising a central portion and a peripheral portion surrounding said central portion;
   b) a preselected quantity of liquid crystal material disposed between the central portions of the pair of substrates;
   c) a barrier fillet disposed between the pair of substrates and in the peripheral portions thereof, said barrier fillet comprising a compressible material which is compressed substantially uniformly between said pair of substrates; and
   d) an adhesive fillet disposed between said pair of substrates in the peripheral portions thereof and substantially forming an effective seal therebetween,
   said adhesive fillet surrounding said barrier fillet, said barrier fillet substantially surrounding and confining said preselected quantity of liquid crystal material to said central portion and out of contact with said adhesive fillet.

8. The liquid crystal display panel as set forth in claim 7, said barrier fillet comprising a ridge of rigid material formed on a surface of one of said pair of substrates,
   said ridge having a layer of compressible material disposed thereupon.

9. The liquid crystal display panel as set forth in claim 7, one of said substrates having a groove which conforms with and tightly embraces said barrier fillet along the length thereof.

10. The liquid crystal display panel as set forth in claim 7, said pair of substrates comprising an outer edge, said outer edge comprising a groove with said adhesive fillet retained therein.

11. A method for fabricating a liquid crystal display panel comprising a pair of substrates mutually spaced-apart by a selected gap, each substrate comprising a central portion and a peripheral portion surrounding said central portion, said method comprising:

a) depositing a substantially continuous barrier fillet of material in the peripheral portion of at least one of the substrates, said barrier fillet being substantially uniformly at least as thick as said gap;

b) depositing a preselected quantity of liquid crystal material in the central portion of a substrate;

c) depositing an adhesive fillet that is thicker than said selected gap in a continuous closed path upon at least one of said peripheral portions; and d) joining the pair of substrates into substantially gap-spaced adjacency of said peripheral portions to cause said barrier fillet to substantially surround and confine said preselected quantity of liquid crystal material to said central portion and out of contact with said adhesive fillet, wherein said depositing said adhesive fillet is carried out by:

i) depositing one component of a two-component epoxy material in a continuous closed path upon the peripheral portion of one of said pair of substrates; and ii) depositing the other component of said two-component epoxy material in a continuous closed path, corresponding to the continuous closed path of said one component, upon the peripheral portion of the other of said pair of substrates, whereby, upon carrying out said depositing said adhesive fillet to join said pair of substrates, said one component is intermixed with said other component along entire lengths of their corresponding closed paths to cause cross-linking to form said adhesive fillet from said two-component epoxy material.

* * * * *